(12) United States Patent
Burger

(10) Patent No.: US 8,549,828 B2
(45) Date of Patent: Oct. 8, 2013

(54) TUGGER AND ACCUMULATOR FOR USE WITH AN AGRICULTURAL BIOMASS HARVESTER

(75) Inventor: John David Burger, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/911,142

(22) Filed: Oct. 25, 2010

(65) Prior Publication Data

US 2012/0096824 A1    Apr. 26, 2012

(51) Int. Cl.
*A01D 45/02* (2006.01)

(52) U.S. Cl.
USPC ................................................. 56/119; 172/7

(58) Field of Classification Search
USPC ...... 56/14.6, 10.2 R, 13.9, 15.5, 15.6, 10.2 A, 56/119; 100/44, 100, 187; 460/114; 209/135, 136, 137, 138, 139.1, 142; 172/7, 9, 10, 677, 317, 239; 701/50
See application file for complete search history.

(56) References Cited

U.S. PATENT DOCUMENTS

| | | | | |
|---|---|---|---|---|
| 2,180,852 A * | 11/1939 | Bussell | ............................ | 100/44 |
| 3,181,892 A * | 5/1965 | Hollyday | ...................... | 280/477 |
| 3,295,299 A * | 1/1967 | Brady et al. | .................... | 56/12.7 |
| 3,298,162 A * | 1/1967 | Medd | .............................. | 56/13.9 |
| 3,421,780 A * | 1/1969 | Rimmey | ........................ | 280/508 |
| 3,487,926 A * | 1/1970 | Brister | .......................... | 209/348 |
| 3,721,075 A * | 3/1973 | Weiberg | ......................... | 56/13.5 |
| 4,199,923 A * | 4/1980 | Blake | ............................. | 56/14.5 |
| 4,943,260 A * | 7/1990 | Fossum | ......................... | 460/96 |
| 5,072,667 A * | 12/1991 | Yeardley | .......................... | 100/3 |
| 5,255,501 A * | 10/1993 | McWilliams | ................... | 56/341 |
| 5,839,954 A * | 11/1998 | Schloesser et al. | ............. | 460/45 |
| 5,899,139 A * | 5/1999 | Dorman | .......................... | 100/24 |
| 5,941,768 A * | 8/1999 | Flamme | ........................ | 460/114 |
| 6,591,743 B2 * | 7/2003 | Deutsch et al. | ................... | 100/8 |
| 6,632,135 B2 * | 10/2003 | Matousek et al. | ............. | 460/23 |
| 6,682,416 B2 * | 1/2004 | Behnke et al. | ................ | 460/114 |
| 7,721,516 B2 * | 5/2010 | Wendling | ................... | 56/10.2 A |
| 7,837,542 B1 * | 11/2010 | Ricketts et al. | ................. | 460/99 |
| 7,927,198 B2 * | 4/2011 | Redekop et al. | ................. | 460/99 |
| 7,927,201 B2 * | 4/2011 | Stukenholtz et al. | ......... | 460/119 |
| 8,112,202 B2 * | 2/2012 | Fackler et al. | ................... | 701/50 |
| 8,113,353 B2 * | 2/2012 | Redekop et al. | ............. | 209/137 |
| 8,132,397 B2 * | 3/2012 | Shields | ............................ | 56/341 |
| 2008/0141639 A1* | 6/2008 | Shields | ........................... | 56/14.6 |
| 2008/0271428 A1 | 11/2008 | Rempe et al. | | |
| 2009/0151313 A1* | 6/2009 | Dillon | ............................ | 56/14.6 |
| 2009/0193777 A1* | 8/2009 | Wendling | ................... | 56/10.2 R |

* cited by examiner

*Primary Examiner* — Árpád Fábián-Kovács
(74) *Attorney, Agent, or Firm* — Quarles & Brady LLP

(57) ABSTRACT

A harvesting system is provided that includes a primary harvester for harvesting grain and biomass, a biomass harvester for further processing the biomass, and a tugger and accumulator coupled between the primary harvester and the biomass harvester. The tugger and accumulator includes an onboard power plant and an onboard propulsion system.

21 Claims, 3 Drawing Sheets

TUGGER AND ACCUMULATOR FOR USE WITH AN AGRICULTURAL BIOMASS HARVESTER

FIELD OF THE INVENTION

The present invention relates to agricultural harvesting equipment, and, more particularly, to biomass harvesters.

BACKGROUND OF THE INVENTION

Biomass harvesters are used to harvest non-grain crop material, i.e., biomass. One type of biomass which has a highly useful energy value is corn cobs. Several important uses for corn cobs include but are not limited to the production of ethanol based fuels, solid fuels, livestock feed, livestock bedding, and industrial absorbents.

A traditional and well known method of harvesting biomass takes the form of a 2 pass operation. In this method, the combine harvester makes the first pass through the field to harvest the grain. As grain harvest takes place, the combine discharges unused plant tissues (biomass) onto the top surface of the field. At a time separate from the grain harvest, a second pass is made through the field to pick up the corn stalks off the top surface of the field and form them into bales, using a tractor and baler apparatus. The tractor is used as a prime mover for the baler apparatus, as shown in U.S. Pat. App. Pub. No. 2008/0271428. Besides the extra time required for a second pass across the field, one problem with a 2 pass system is a portion of the highly valuable corn cobs fall through the teeth of the hay pickup and are lost during process To address this problem, a more recent 1 pass biomass harvesting method has been developed. The 1 pass method enables a baler or accumulation wagon to be pulled directly behind the grain combine harvester, with the biomass picked up at the rear of the combine by the biomass harvester before it touches the top surface of the ground. Such biomass harvesting systems couple the baler directly with the combine as a prime mover, and use power-take-off (PTO) and/or hydraulic power from the combine's engine to power the baler. There are several issues with the current single pass biomass harvesting method (baling or accumulating), which are presently limiting corn cob production.

With regard to accumulation, harvesting loosely accumulated biomass vs. one-pass corn cob baling requires more labor and materials during the grain harvest. It may also require the combine harvester to slow down or stop, thus negatively impacting the speed of the grain harvest. For example, one present and popular method of loose accumulation is to modify a combine harvester with a blower unit at the rear of the combine below the chopper. The blower accumulates and blasts the loose biomass material into an accumulation wagon. When the accumulation wagon is full, the grain harvester has to stop in order for it to unload. Similar to harvesting a forage product, this requires a separate man in a tractor, with a second accumulation wagon which is used to offload. The second accumulation wagon is then towed away and unloaded. This process requires one extra man and tractor to unload the accumulation wagon. In this example, the essence of the problem is that the extra labor and materials associated with harvesting biomass are required during the grain harvest. This adds complexity and cost to the producer's overall cropping system.

With regard to baling, the present single pass biomass harvesting technology is specific to a particular make or model of combine harvester due to the design of its onboard power plant, chassis, and powertrain. With regard to the powerplant, the combine's engine is used to power the biomass harvester (typically a baler) in addition to the combine during the grain harvest. Due to the size variability and demands of the combine engine's power, this approach makes the biomass harvester's use specific to a single make and/or model and/or age of the combine. For example, a 10 yr. old combine harvester may not have enough extra engine power to operate a one-pass biomass harvester baler, since this was not part of the older combine's original design intent. Thus, in order for a producer to harvest biomass in the form of bales with the current single pass method, it would be necessary to purchase a newer combine harvester. Purchasing a newer combine may represent a cost prohibitive risk for many producers; thus, limiting overall biomass production.

With regard to the chassis and powertrain, the present single pass biomass harvesting technology directly connects a biomass harvester (typically a baler) to the combine. Due to the weight of the biomass harvester, the load requirement on a combine's chassis and propulsion system may become excessive. For example, a 10 yr old combine harvester may experience a higher frequency of breakdowns due to the added weight of pulling the biomass harvester, again since this was not part of the older combine's original design intent. It is also specific to a particular make or model of combine harvester due to the strength of it's chassis and drivetrain.

A third issue with the present single pass method is that using a combine harvester to power and pull the biomass harvester can also potentially slow down the grain harvesting process, by added power and load requirements. Specifically, the added power requirements of the biomass harvester may potentially impact the combine's ground speed. The added weight of the biomass harvester may potentially impact the combine's reliability and cause downtime otherwise not experienced when it was used only for grain harvesting. Slowing down the grain harvest in a time when producers demand more productive products and solutions is not an ideal situation.

What is needed in the art is a biomass harvesting system which effectively harvests corn cob biomass, which is discharged from a primary harvester before it contacts the ground, while at the same time does not substantially decrease available horsepower or require excessive towing loads from the primary harvester.

SUMMARY

The present invention provides a tugger/accumulator (T/A) which is positioned between and interconnects a primary harvester, such as a combine, with a biomass harvester, such as a round baler. The T/A has a pre-collection hopper, an onboard power plant, such as a diesel engine, and an onboard propulsion system, such as a hydraulic pump and hydraulic motors.

The present invention relates to a new machine form which connects a combine harvester with a baler, facilitating the baler's use as a continuous single pass biomass harvester. The new machine form has four purposes, which are to (1) collect corn cobs biomass before it contacts the ground surface (2) to intelligently feed the corn cobs into a baler, (3) to independently power itself and baler, and to (4) independently pull itself and the baler through the field, using the combine for guidance instead of a prime mover.

The invention in one form is directed to an agricultural harvesting system including a primary harvester for harvesting grain and biomass, a biomass harvester for further processing the biomass, and a T/A coupled between the primary harvester and the biomass harvester. The T/A includes an onboard power plant and an onboard propulsion system.

The invention in another form is directed to an agricultural implement couplable between a primary source of motive power and a secondary implement. The agricultural implement includes a T/A with a hopper for holding crop material, an onboard power plant and an onboard propulsion system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION

Figure 1:
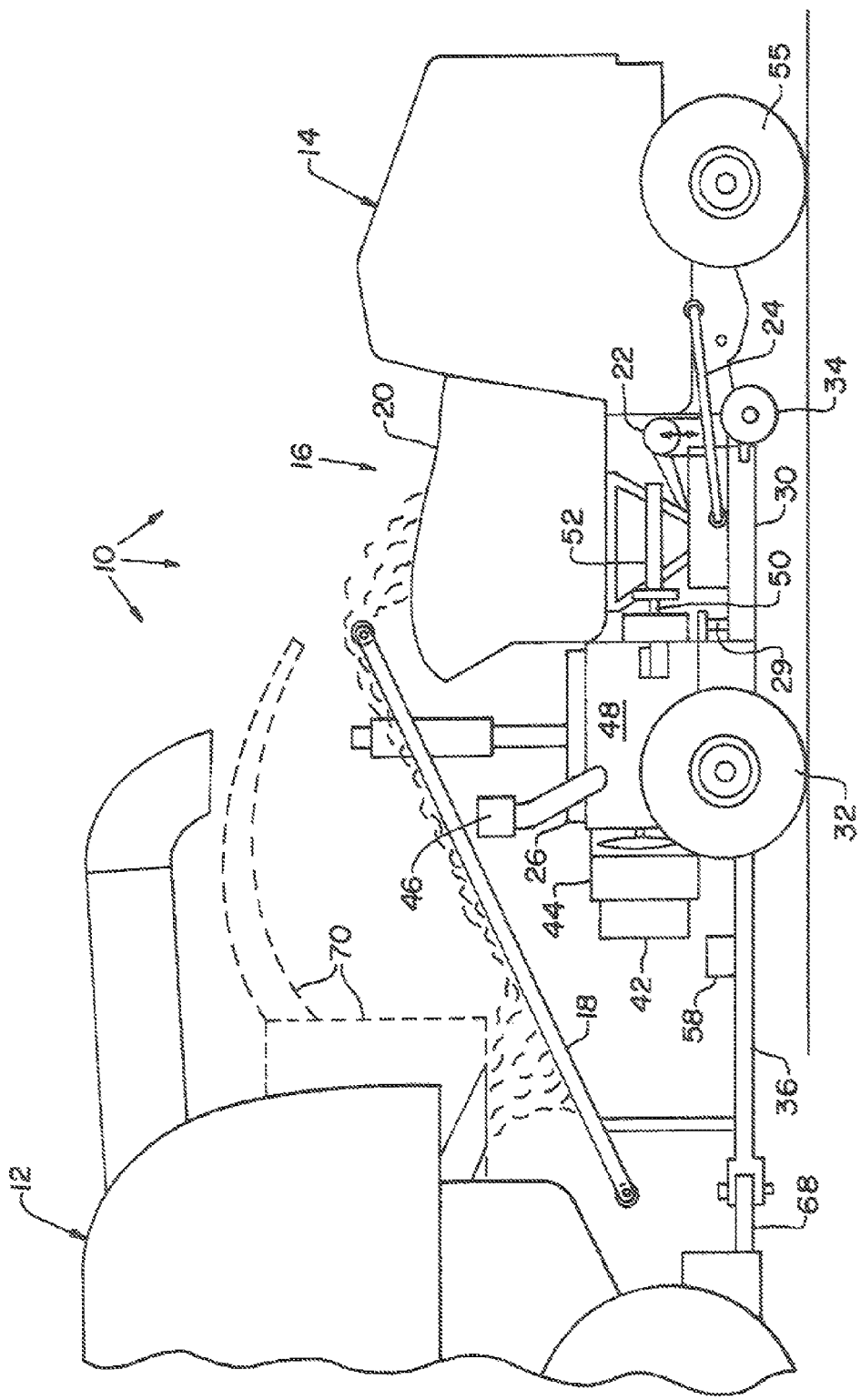
FIG. 1 is a schematic side view of an embodiment of a T/A of the present invention.

Referring now to the drawings, there is shown an embodiment of an agricultural harvesting system 10, which generally includes a primary harvester 12, biomass harvester 14, and T/A 16. Primary harvester 12 is shown in the form of a combine, and only a rear portion of the combine is shown in fragmentary form for simplicity's sake. Primary harvester 12 could be a different type of harvester, such as a sugar cane harvester, etc. Primary harvester 12 defines a primary source of motive power of agricultural harvesting system 10 through a field in which agricultural harvesting occurs.

Biomass harvester 14 is shown as a round baler, and, in particular, a John Deere 568 round baler. However, biomass harvester 14 could be configured as a different type of biomass harvester, such as a large square baler, a modified silage wagon or cart, etc. Biomass harvester 14 defines a secondary implement which is towed behind primary harvester 12 (or primary implement) through the field during a harvesting operation.

T/A 16 is coupled between and interconnects primary harvester 12 with biomass harvester 14. T/A 16 generally includes an input conveyor 18, a pre-collection hopper 20, an adjustable compression roller 22, an output conveyor 24, an onboard power plant 26, and an onboard propulsion system 28. The various components making up T/A 16 are carried by a frame 30, to which is mounted a pair of steerable wheels 32, one or more dolly wheels 34, and a hitch tongue 36.

Input conveyor 18 is positioned to convey biomass from primary harvester 12 to pre-collection hopper 20. The input end of input conveyor 18 is positioned at the rear of primary harvester 12 to receive biomass, which is discharged from the rear of primary harvester 12. Input conveyor 18 is configured as a belt conveyor in the illustrated embodiment, but could be differently configured, such as a chain conveyor, etc.

Pre-collection hopper 20 is positioned below the discharge end of input conveyor 18, and temporarily holds biomass prior to transport to biomass harvester 14. Pre-collection hopper 20 may be sized and shaped according to the specific application. For example, pre-collection hopper 20 may be sized to temporarily hold biomass during an unloading operation of biomass harvester 14.

Adjustable compression roller 22 is positioned below pre-collection hopper 20 and compresses the biomass prior to being conveyed by output conveyor 24. In the illustrated embodiment, adjustable compression roller 22 is separate from and below pre-collection hopper 20, but could also be configured as an integral part of pre-collection hopper 20 at the bottom thereof.

Output conveyor 24 receives the compressed biomass from adjustable compression roller 22 and conveys the biomass to biomass harvester 14. Output conveyor 24 is configured as a belt conveyor in the illustrated embodiment, but could be differently configured, such as a chain conveyor, etc. Output conveyor 24 is sized and operates at a transfer speed according to the particular application.

Output conveyor 24 is configured and controlled not to convey biomass from pre-collection hopper 20 to biomass harvester 14 during an unloading operation of the biomass from biomass harvester 14. Biomass is thus temporarily allowed to accumulate in pre-collection hopper 20 to effect continuous operation of primary harvester 12 during an unloading operation of biomass harvester 14.

Figure 2:
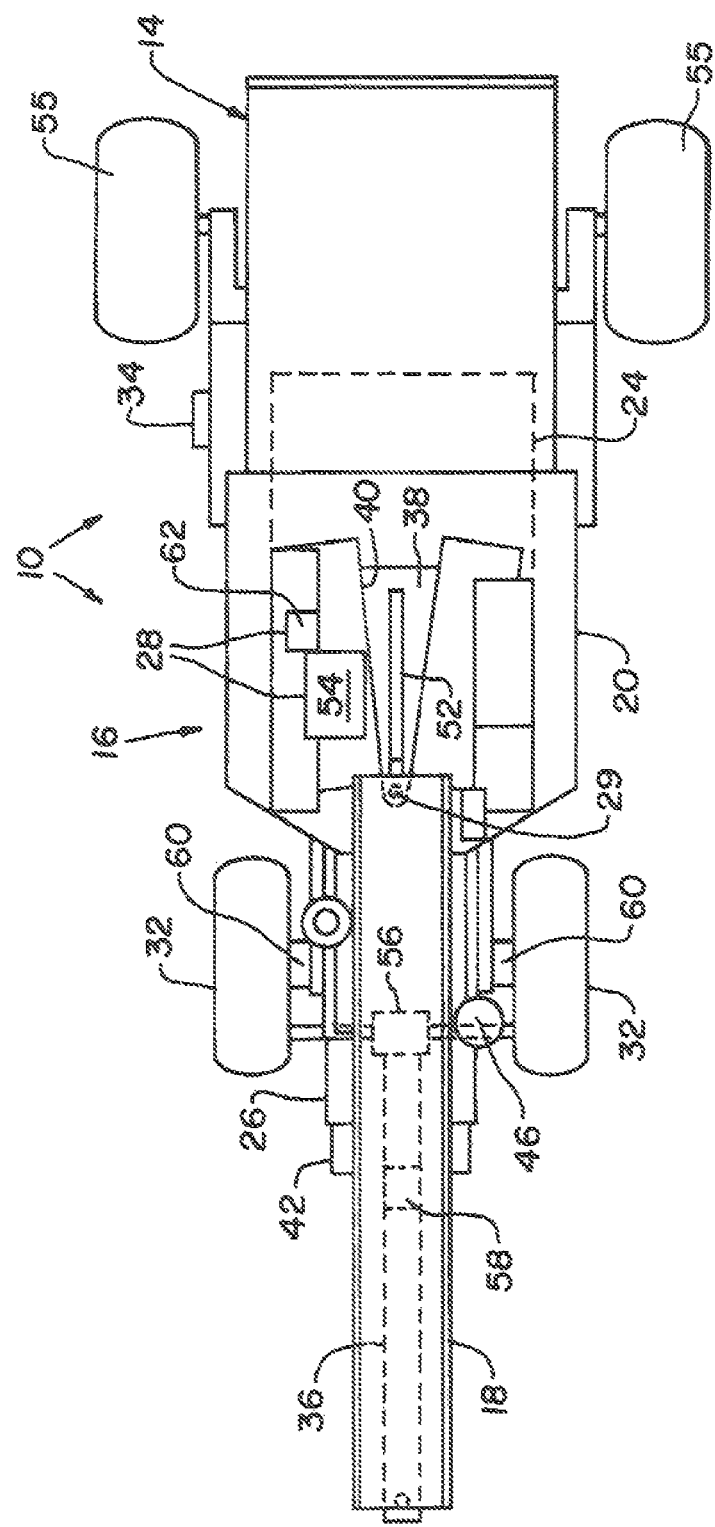
FIG. 2 is a schematic top view of the T/A shown in FIG. 1.

To ensure that the biomass is picked up by biomass harvester 14, as well as to ensure that biomass harvester 14 is steered during operation, biomass harvester 14 is coupled with T/A 16 in a manner such that horizontal and vertical articulation does not occur between biomass harvester 14 and T/A 16. For example, referring to FIG. 2, it may be seen that a hitch 38 of biomass harvester 14 is received within a corresponding shaped recess or opening 40 such that articulation (vertical and horizontal) does not occur between biomass harvester 14 and T/A 16. A hitch pin 29 is used to lock fore/aft movement between T/A 16 and biomass harvester 14.

Onboard power plant 26 is in the form of an internal combustion (IC) engine which provides power to each of T/A 16 and biomass harvester 14. In the illustrated embodiment, onboard power plant 26 is assumed to be a 90 horsepower diesel engine, but could be differently configured, such as a different sized diesel engine, a gasoline engine, a propane engine, etc. Further, for some applications, onboard power plant 26 could be configured as multiple smaller engines which share load requirements, or even a hybrid engine with a motor/generator for driving various types of loads. When configured as a diesel engine, onboard power plant 26 may include a rotary air cleaner 42, a radiator 44, an air filter 46, and an engine block 48 with a number of combustion cylinders (not shown). A crankshaft or output shaft 50 is coupled with a drive line 52, which in turn provides input power to the various driven components of T/A 16 and biomass harvester 14, such as hydraulic pump 54, adjustable compression roller 22, input conveyor 18, output conveyor 24, and a PTO shaft (not visible) of biomass harvester 14. Hydraulic pump 54 may be used to power remote hydraulic outlets for use with biomass harvester 14, through either automated or manual operation.

Onboard propulsion system 28 provides motive power to one or both of the steerable wheels 32. Onboard propulsion system 28 is configured as a hydraulic propulsion system, but could be differently configured depending on the application. For example, onboard propulsion system 28 could be configured to include an electronically shifted geared transmission.

Dolly wheels 34 allow T/A 16 to be towed when not coupled with biomass harvester 14. When biomass harvester 14 is unhitched from T/A 16, the rear end of T/A 16 drops down, allowing dolly wheels 34 to contact the ground. The dolly wheel 34 height can be mechanically adjusted to facilitate coupling with the baler. Additionally, controls on T/A 16 allow an operator to manually guide it forward or reverse. When T/A 16 is coupled with biomass harvester 14, the pair of wheels 32, 55 associated with each of biomass harvester 14 and T/A 16 in essence together define a four-wheeled wagon with a steerable tongue at the front end.

Steerable wheels 32 are coupled with hitch tongue 36 via a steering assembly 56 in the form of a pair of tie rods. Steering assembly 56 may be differently configured, such as a single tie rod extending to one of the steerable wheels 32, and a long tie rod extending between and interconnecting the steerable wheels 32. Alternatively, steerable wheels 32 could be electronically controlled, such as through the use of an electronic controller, which receives signals in a wired or wireless fashion corresponding to the steering wheel position within primary harvester 12.

Hitch tongue 36 is pivotally coupled about a generally horizontal axis with the frame 30 of T/A 16 such that substantially no significant vertical load is placed on the rear end of primary harvester 12.

Automatic movement is achieved when a push or pull load is applied to tongue 36 hitch. The push or pull load is realized through a load sensing system 64, which includes a propulsion control device 58 and propulsion control system 28. Propulsion control device 58 is positioned in association with hitch tongue 36, and controls operation of onboard propulsion system 28, dependent upon a towed state of hitch tongue 36. Propulsion control device 58 senses a towed state of hitch tongue 36 and provides an output signal to onboard propulsion system 28 for controlling propulsion of T/A 16. The input signal may be in the form of a hydraulic, electrical, or mechanical input signal.

Figure 3:
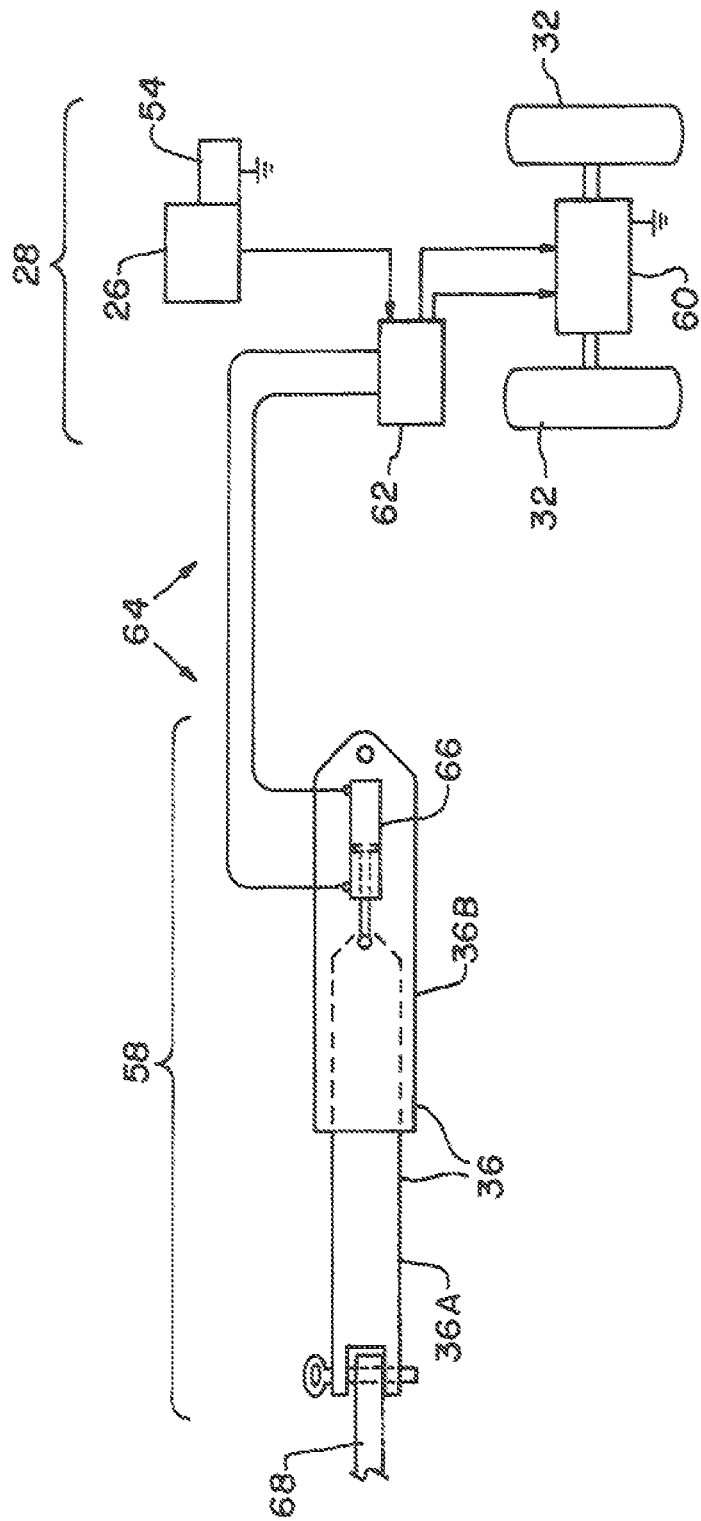
FIG. 3 is a top schematic view of the onboard propulsion system shown in FIG. 2.

Referring now to FIG. 3, steerable wheels 32 are powered by one or more hydraulic motors 60, which are in turn powered by hydraulic pump 54 that is driven by onboard power plant (engine) 26. Hydraulic motors 60 are turned on automatically by a control valve 62. Control valve 62 may be actuated mechanically or electronically through a load sensing system 64 based on force input to hitch tongue 36 of T/A 16. For example, when the primary harvester 12 begins to move forward, a pulling force is applied from the combine's hitch 68 to hitch tongue 36. As the pull force increases, the T/A's tongue length elongates in length. The amount and rate of the elongation of hitch tongue 36 is then used to open control valve 62 in proportion; thus supplying hydraulic oil flow from hydraulic pump 54 to hydraulic motors 60 which power the steerable wheels 32. The process happens quickly, within a second so that the speed of the steerable wheels 32 matches the combine's speed. In this manner, T/A 16 begins to pull itself and the biomass harvester (round baler) 14 behind the primary harvester 12. This significantly reduces the load on the combine's power train and chassis, serving only to guide rather than pull T/A 16 through the field. Load sensing system 64 also works in reverse, in that a push load on hitch tongue 36 causes reverse motion in the steerable wheels 32 of T/A 16.

More specifically, load sensing system 64 may include a telescoping hitch tongue 36 with a hydraulic cylinder 66 which bridges a front telescoping section 36A and back telescoping section 36B. This forms a pilot hydraulic system. The pilot hydraulic system functions such that when the tongue is pulled forward, the front telescoping section 36A of hitch tongue 36 translates relative to the back telescoping section 36B and causes the piston inside hydraulic cylinder 66 to move forward. The piston's movement displaces hydraulic oil, which is plumbed to a port on control valve 62. The oil displaced from the pilot system causes control valve 62 to open in proportion, which allows oil to flow from hydraulic pump 54 to hydraulic motors 60, thus creating movement of steerable wheels 32. Ideally, the amount of tractive effort created by steerable wheels 32 can be identical to the input provided by the combine's hitch. This effectively results in a zero load on the combine hitch when the system is in a steady state (i.e., a constant travel speed in the field).

The load sensing system 64 can also be configured as an electronic load sensing system. For example, a telescoping hitch tongue 36 may include electronic components such as an LVDT, strain gauge or potentiometer, which bridges the front and back telescoping sections 36A and 36B. Similar to the mechanical system described above, the electro-hydraulic control system functions such that as the tongue is pulled forward, the front section 36A of hitch tongue 36 translates relative to the back section 36B and causes the electronic device to move forward. The movement causes a change in an electronic signal, such as a voltage, amperage and/or frequency, which can be read by a controller (not shown). The controller causes a solenoid on control valve 62 to open in proportion to the signal, which allows oil to flow from hydraulic pump 54 to hydraulic motors 60, thus creating movement of steerable wheels 32.

For some applications, it may be necessary to design stops in hitch tongue 36 which limits elongation of hitch tongue 36 and thus prevents the load sensing hydraulic cylinder 66 from becoming overloaded. One example would be pulling T/A 16 through a small washout or erosion ditch in a field which would cause it to jerk. Additionally, it may be necessary to design overrunning clutches in steerable wheels 32 which allow them to free wheel if the ground speed input from the combine hitch exceeds the hydraulic capacity of T/A 16. One example would be the case of transporting T/A 16 on a road.

An optional blower 70 is shown in FIG. 1 at the rear of primary harvester 12. Blower 70 would take the place of input conveyor 18 to transfer biomass from primary harvester 12 to T/A 16. Blowers of this type that use power from primary harvester 12 are known and used to blow biomass into a biomass wagon, similar to a silage wagon. In this case, however, blower 70 would blow the biomass into pre-collection hopper 20 of T/A 16. Moreover, blower 70 would utilize power from T/A 16 rather than rob power from primary harvester 12. For example, blower 70 could be powered by hydraulic hoses or electric lines extending from T/A 16.

As yet another option, it may be possible to equip primary harvester 12 with a vacuum system which transfers biomass from primary harvester 12 to pre-collection hopper 20. As with blower 70 described above, a vacuum system would utilize hydraulic or electric power from T/A 16 rather than primary harvester 12.

The present invention eliminates the need for an accumulation cart requirement and thus the extra man and extra tractor. Making the bales "on the fly" and dropping the bales without slowing down the harvester enables collection of the biomass product to be completed at a time separate from the grain harvest. With a separate biomass collection time, the same person and tractor used for grain harvest can potentially be used for the subsequent biomass collection. This situation also provides better asset utilization for a farmer's cropping system. The round baler is widely used in the corn belt for production of other feed crops such as alfalfa. Many producers already own round balers and machinery to collect and store the bale products. Thus, a round baling biomass harvester theoretically improves the asset utilization of the farmer's cropping systems.

By guiding instead of pulling T/A 16, older makes and models of combines can be used to harvest biomass in a single pass operation. This gives a producer flexibility, because he is not forced to buy a new harvester specifically designed (with larger power train & chassis) for biomass. Instead, T/A 16 can be purchased for about 1/10 the capital cost and integrated with a round baler (which many corn belt producers already own).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural harvesting system, comprising:
    a primary harvester for harvesting grain and biomass;
    a biomass harvester for further processing the biomass;
    a tugger and accumulator coupled between said primary harvester and said biomass harvester, said tugger and accumulator including an onboard power plant and an onboard propulsion system; and
    a propulsion control device for controlling operation of said onboard propulsion system based upon, at least in part, detecting a towed state of said tugger and accumulator;
    wherein the propulsion control device includes a load sensing system, the propulsion control device being configured to automatically control, at least in part, propulsion of the tugger and accumulator based upon the loading sensing system sensing a push or pull load.

2. The agricultural harvesting system of claim 1, wherein said tugger and accumulator includes a pre-collection hopper for temporarily holding biomass prior to transport to said biomass harvester.

3. The agricultural harvesting system of claim 2, including an input conveyor positioned to convey biomass from said primary harvester to said pre-collection hopper.

4. The agricultural harvesting system of claim 2, including an output conveyor positioned to convey biomass from said pre-collection hopper to said biomass harvester.

5. The agricultural harvesting system of claim 4, wherein said output conveyor is configured not to convey biomass from said accumulator to said biomass harvester during an unloading operation of the biomass from said biomass harvester, thereby allowing the biomass to temporarily accumulate in the pre-collection hopper and effecting continuous operation of the primary harvester during the unloading operation.

6. The agricultural harvesting system of claim 5, including an adjustable compression roller associated with said pre-collection hopper for compressing the biomass prior to being conveyed by said output conveyor.

7. The agricultural harvesting system of claim 1, wherein said tugger and accumulator includes a pair of steerable wheels, a hitch tongue at a forward end of said tugger and accumulator, and a steering assembly coupled with said hitch tongue and at least one of said steerable wheels.

8. The agricultural harvesting system of claim 1, wherein said tugger and accumulator includes a pair of wheels, said power plant provides power to each of said tugger and accumulator and said biomass harvester, and said propulsion system provides motive power to at least one of said wheels.

9. The agricultural harvesting system of claim 1, wherein said tugger and accumulator is coupled with said biomass harvester in a manner such that both vertical and horizontal articulation does not occur between said tugger and accumulator and said biomass harvester.

10. The agricultural harvesting system of claim 9, wherein said tugger and accumulator includes a pair of steerable wheels and a vertically floating hitch tongue, and said biomass harvester includes a pair of wheels, such that said hitch tongue does not place a vertical load on said primary harvester.

11. The agricultural harvesting system of claim 1, wherein said onboard power plant is an engine and said onboard propulsion system is a hydrostatic propulsion system.

12. The agricultural harvesting system of claim 1, wherein said tugger and accumulator includes a hitch tongue at a forward end of said tugger and accumulator, and said propulsion control device controls operation of said propulsion system, dependent on a towed state of said hitch tongue.

13. An agricultural harvesting system including a primary harvester for harvesting grain and biomass, and a biomass harvester for further processing the biomass, said agricultural harvesting system comprising:
    a tugger and accumulator couplable between the primary harvester and the biomass harvester, said tugger and accumulator including an onboard power plant and an onboard propulsion system; and
    a propulsion control device for controlling operation of said onboard propulsion system based upon, at least in part, detecting a towed state of said tugger and accumulator;
    wherein the propulsion control device includes a load sensing system, the propulsion control device being configured to automatically control, at least in part, propulsion of the tugger and accumulator based upon the loading sensing system sensing a push or pull load.

14. The agricultural harvesting system of claim 13, wherein said tugger and accumulator includes a pre-collection hopper for temporarily holding biomass.

15. The agricultural harvesting system of claim 14, including an input conveyor positioned to convey biomass to said pre-collection hopper.

16. The agricultural harvesting system of claim 14, including an output conveyor positioned to convey biomass from said pre-collection hopper.

17. The agricultural harvesting system of claim 16, including an adjustable compression roller associated with said pre-collection hopper for compressing the biomass prior to being conveyed by said output conveyor.

18. The agricultural harvesting system of claim 13, wherein said tugger and accumulator includes a pair of steerable wheels, a hitch tongue at a forward end of said tugger and accumulator, and a steering assembly coupled with said hitch tongue and at least one of said steerable wheels.

19. The agricultural harvesting system of claim 13, wherein said tugger and accumulator is couplable with the biomass harvester in a manner such that articulation does not occur between said tugger and accumulator and the biomass harvester.

20. The agricultural harvesting system of claim 19, wherein said tugger and accumulator includes a pair of steerable wheels and a vertically floating hitch tongue.

21. The agricultural harvesting system of claim 13, wherein said onboard power plant is an engine and said onboard propulsion system is a hydrostatic propulsion system.

\* \* \* \* \*